(12) United States Patent
Oida et al.

(10) Patent No.: US 7,722,052 B2
(45) Date of Patent: May 25, 2010

(54) ROTATION SHAFT SEAL

(75) Inventors: Hironori Oida, Wakayama (JP);
Tetsuya Ashida, Hyogo (JP)

(73) Assignee: Mitsubishi Cable Industries, Ltd., Tokyo (JP)

( * ) Notice: Subject to any disclaimer, the term of this patent is extended or adjusted under 35 U.S.C. 154(b) by 434 days.

(21) Appl. No.: 11/723,461

(22) Filed: Mar. 20, 2007

(65) Prior Publication Data
US 2007/0228663 A1 Oct. 4, 2007

(30) Foreign Application Priority Data
Mar. 28, 2006 (JP) ............................. 2006-087331

(51) Int. Cl.
*F16J 15/32* (2006.01)
(52) U.S. Cl. .................... 277/564; 277/562; 277/572; 277/574; 277/577
(58) Field of Classification Search ............... 277/551, 277/562, 564, 572–574, 577
See application file for complete search history.

(56) References Cited

U.S. PATENT DOCUMENTS

| | | | | |
|---|---|---|---|---|
| 1,942,705 A * | 1/1934 | Hubbard et al. | ............. | 277/576 |
| 2,834,616 A * | 5/1958 | Gebert et al. | ............. | 277/356 |
| 2,887,331 A * | 5/1959 | Johnson | ............. | 277/562 |
| 3,356,376 A * | 12/1967 | Bradfute et al. | ............. | 277/574 |
| 3,843,139 A * | 10/1974 | Messenger | ............. | 277/573 |
| 4,026,563 A * | 5/1977 | Bainard | ............. | 277/309 |
| 4,448,426 A * | 5/1984 | Jackowski et al. | ............. | 277/353 |
| 4,721,314 A * | 1/1988 | Kanayama et al. | ............. | 277/576 |
| 5,052,696 A * | 10/1991 | Hatch | ............. | 277/562 |
| 5,056,799 A * | 10/1991 | Takenaka et al. | ............. | 277/562 |
| 5,183,271 A * | 2/1993 | Wada et al. | ............. | 277/351 |
| 5,326,111 A * | 7/1994 | Hatch | ............. | 277/565 |
| 5,509,667 A * | 4/1996 | Klein et al. | ............. | 277/565 |
| 5,649,710 A * | 7/1997 | Kanda | ............. | 277/371 |
| 5,860,656 A * | 1/1999 | Obata et al. | ............. | 277/559 |
| 6,123,514 A * | 9/2000 | Kawaguchi et al. | ....... | 417/222.2 |
| 6,517,082 B2 * | 2/2003 | Yamada et al. | ............. | 277/559 |
| 6,543,786 B2 * | 4/2003 | Osumi et al. | ............. | 277/549 |
| 7,055,824 B2 * | 6/2006 | Kobayashi et al. | ......... | 277/309 |
| 7,147,229 B2 * | 12/2006 | Madigan | ............. | 277/551 |
| 7,344,140 B2 * | 3/2008 | Ikeda | ............. | 277/572 |
| 7,396,016 B2 * | 7/2008 | Liao et al. | ............. | 277/353 |
| 2002/0003338 A1 * | 1/2002 | Osumi et al. | ............. | 277/562 |
| 2006/0208428 A1 * | 9/2006 | Oiyama et al. | ............. | 277/551 |
| 2006/0249915 A1 * | 11/2006 | Madigan | ............. | 277/551 |
| 2007/0052180 A1 * | 3/2007 | Watanabe et al. | ............. | 277/551 |
| 2008/0054572 A1 * | 3/2008 | Maskaliunas | ............. | 277/551 |
| 2008/0179835 A1 * | 7/2008 | Laplante | ............. | 277/562 |

FOREIGN PATENT DOCUMENTS

| | | |
|---|---|---|
| JP | 2003-97723 | 4/2003 |
| JP | 2004-353765 | 12/2004 |

* cited by examiner

*Primary Examiner*—Alison K Pickard
(74) *Attorney, Agent, or Firm*—Kratz, Quintos & Hanson, LLP

(57) ABSTRACT

A rotation shaft seal to prevent inner leak from increasing along high-pressurization of sealed gas. A staged portion is formed on an outer case, and an end face on an inner side of the staged portion is covered with rubber to form a ring rubber portion of which end face is covered. A rubber end face of the rubber portion and a face on a peripheral edge of a seal element are pressed to each other.

1 Claim, 9 Drawing Sheets

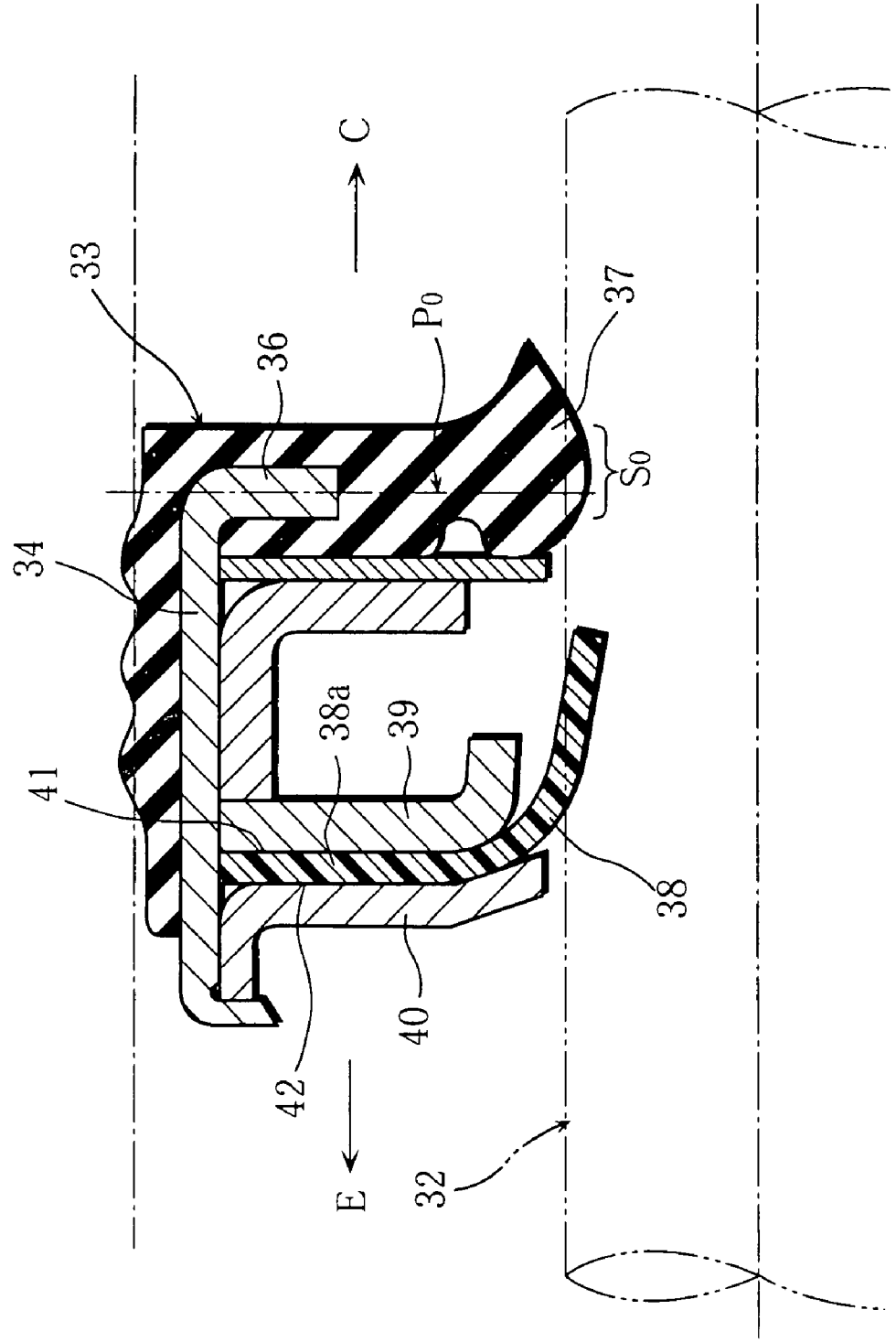

ROTATION SHAFT SEAL

BACKGROUND OF THE INVENTION

1. Field of the Invention

This invention relates to a rotation shaft seal, especially, a rotation shaft seal used to seal high-pressure fluid such as $CO_2$ gas.

2. Description of the Related Art

Recently, pressure of sealed fluid (such as $CO_2$) has been increasing in use of compressors for automobiles. So the applicant of the present invention proposed a rotation shaft seal as shown in FIG. 9 (refer to Japanese provisional publication No. 2004-353765). In FIG. 9, a rubber sealing portion 33 having a sliding portion $S_0$ which contacts surface of a rotation shaft 32 and an outer case 34 are unified, an inner brim portion 36 on a high-pressure side C of the outer case 34 is covered by the rubber sealing portion 33, and, disposing the sliding portion $S_0$ of the sealing portion 33 on an axis-orthogonal face $P_0$ including the inner brim portion 36, a lip portion 37 of the sealing portion 33 slides on the rotation shaft 32 with low contact pressure when receiving high pressure from the high-pressure side C.

In a rotation shaft seal precedent to the conventional example in FIG. 9, excessive contact pressure is generated on the surface of the rotation shaft in rotation and early abnormal abrasion is generated on the sliding portion of the rubber lip along with the excessive contact pressure because the configuration of the rubber lip is having an L-shaped cross-section, largely extended to the sealed fluid side, and a large area of pressure-receiving portion (refer to Japanese provisional publication No. 2003-97723).

As described above, in the conventional example shown in FIG. 9, the early abnormal abrasion of the lip portion 37 on the sliding portion $S_0$ can be effectively prevented. However, it has been revealed that a problem of fluid (gas) leakage within a long period of time from the high-pressure side C to the low pressure side E, namely, inner-leak problem is not solved by the conventional construction in FIG. 9.

Concretely, although a seal element 38 of resin such as PTFE is disposed on the low-pressure side E and two inner cases 39 and 40 are holding an axis-orthogonal portion 38a of the seal element 38 as to be sandwiched, an experiment conducted by the inventors of the present invention revealed generation of inner leak as shown with arrows $F_1$ and $F_2$, broken lines, and an arrow $F_3$ in FIG. 8 (described later).

Recently, it has been desired to make the pressure of the sealed fluid (gas) higher, and it has been revealed that the inner leak of the fluid such as gas tending to have high pressure can not be prevented with the conventional example shown in FIG. 9 in which the faces 41 and 42 of the axis-orthogonal portion 38a of the seal element 38 are simply held by the inner cases 39 and 40.

It is therefore an object of the present invention to provide a rotation shaft seal which solves all of the above-described problems, prevents inner leak, and performs stable and excellent sealability for sealing high-pressure gas.

BRIEF DESCRIPTION OF THE DRAWINGS

The present invention will be described with reference to the accompanying drawings in which:

FIG. 9 is a cross-sectional view of a principal portion showing a conventional example.

DESCRIPTION OF THE PREFERRED EMBODIMENTS

Preferred embodiments of the present invention will now be described with reference to the accompanying drawings.

Figure 1:
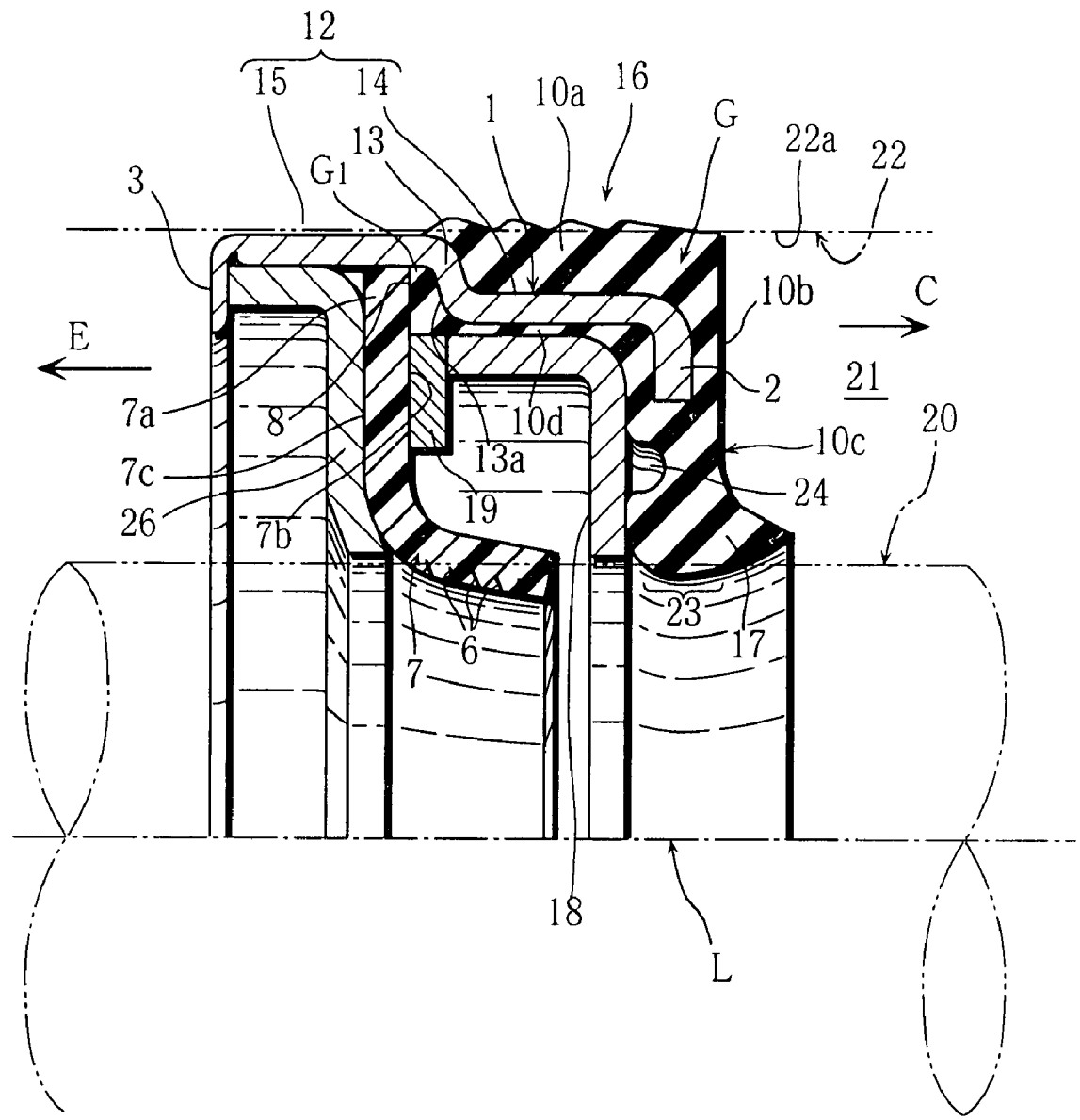
FIG. 1 is a cross-sectional view of a principal portion showing an embodiment of the present invention.
Figure 2:
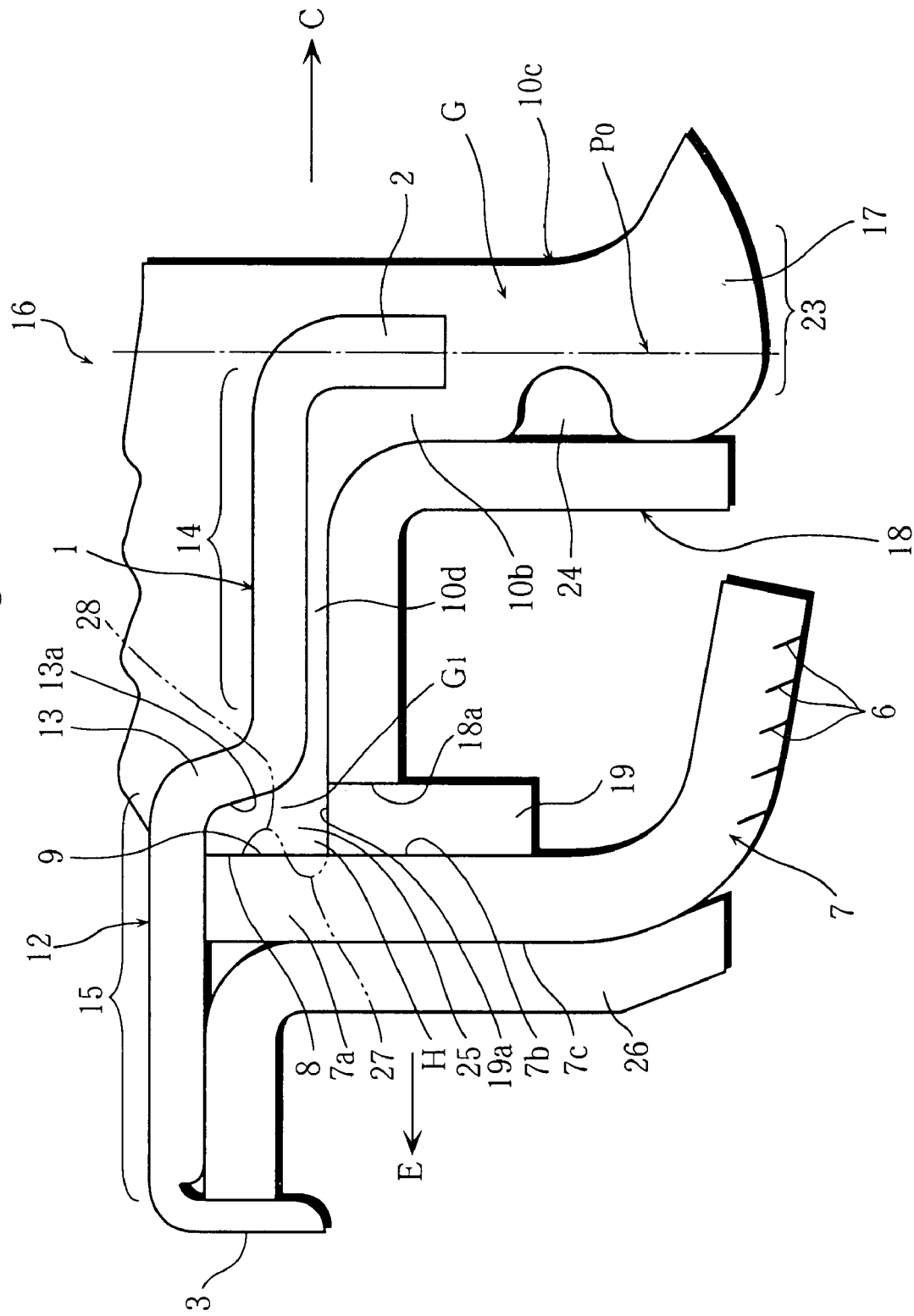
FIG. 2 is an enlarged explanatory cross-sectional view of a principal portion.

FIGS. 1 through 6 show an embodiment of the present invention. FIG. 1 is a cross-sectional view of a principal portion, FIG. 2 is an enlarged explanatory view of FIG. 1, and FIGS. 3 through 6 are cross-sectional explanatory views to explain constructional parts and serially show an assembly method.

In FIG. 1 and FIG. 2, this rotation shaft seal is disposed between a rotation shaft 20 shown with broken lines and a housing 22, and, for example, for sealing gas (fluid) as high-pressure cooling media in a sealed fluid chamber 21 on a high-pressure side C. Solid lines in FIG. 1 show a free state (unattached state) of the rotation shaft seal 16. In an attached state in which the rotation shaft seal 16 is disposed between the rotation shaft 20 and the housing 22, (although not shown in figures) parts are elastically deformed.

Figure 3:
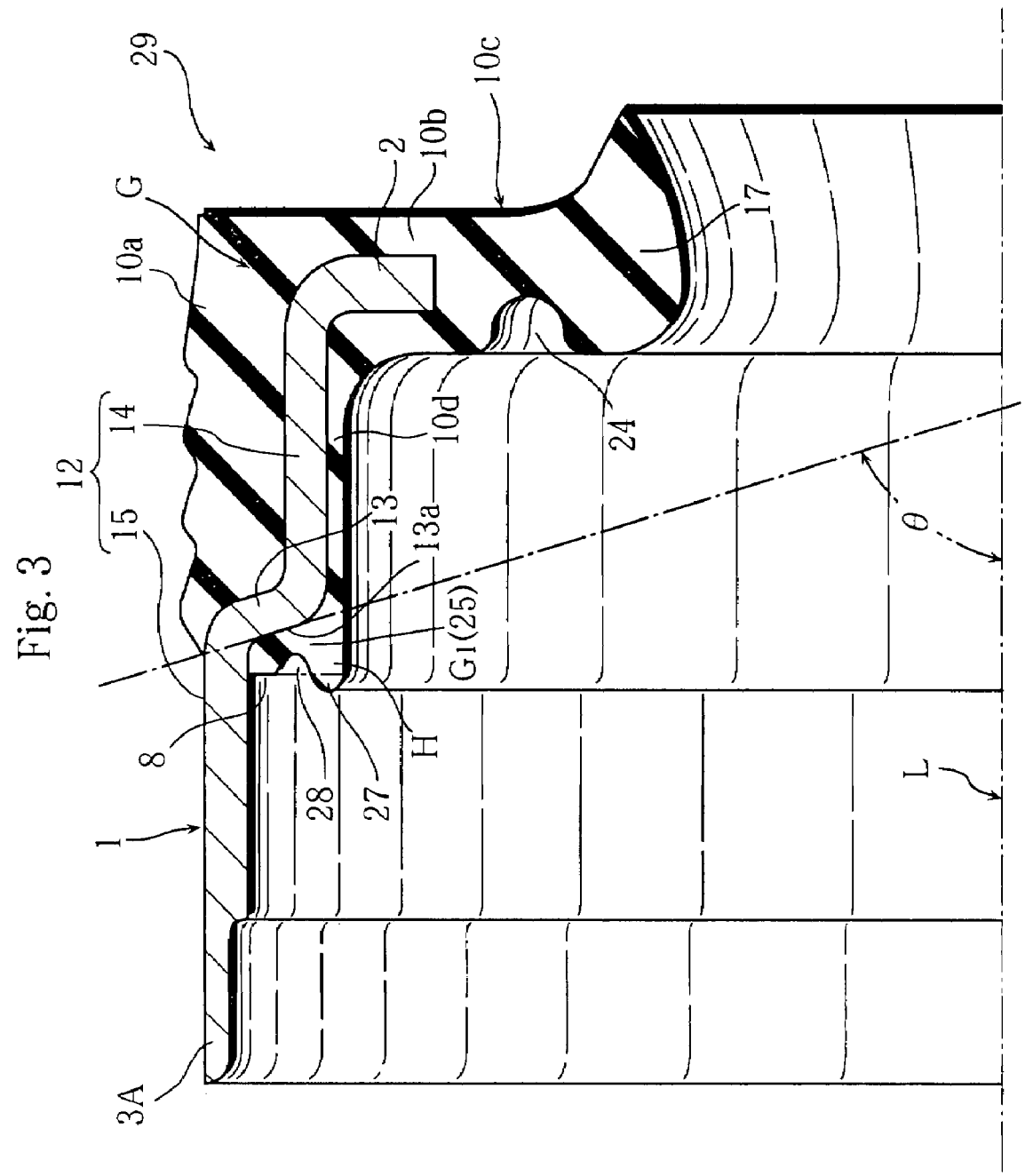
FIG. 3 is a cross-sectional view of a principal portion showing main parts.
Figure 4:
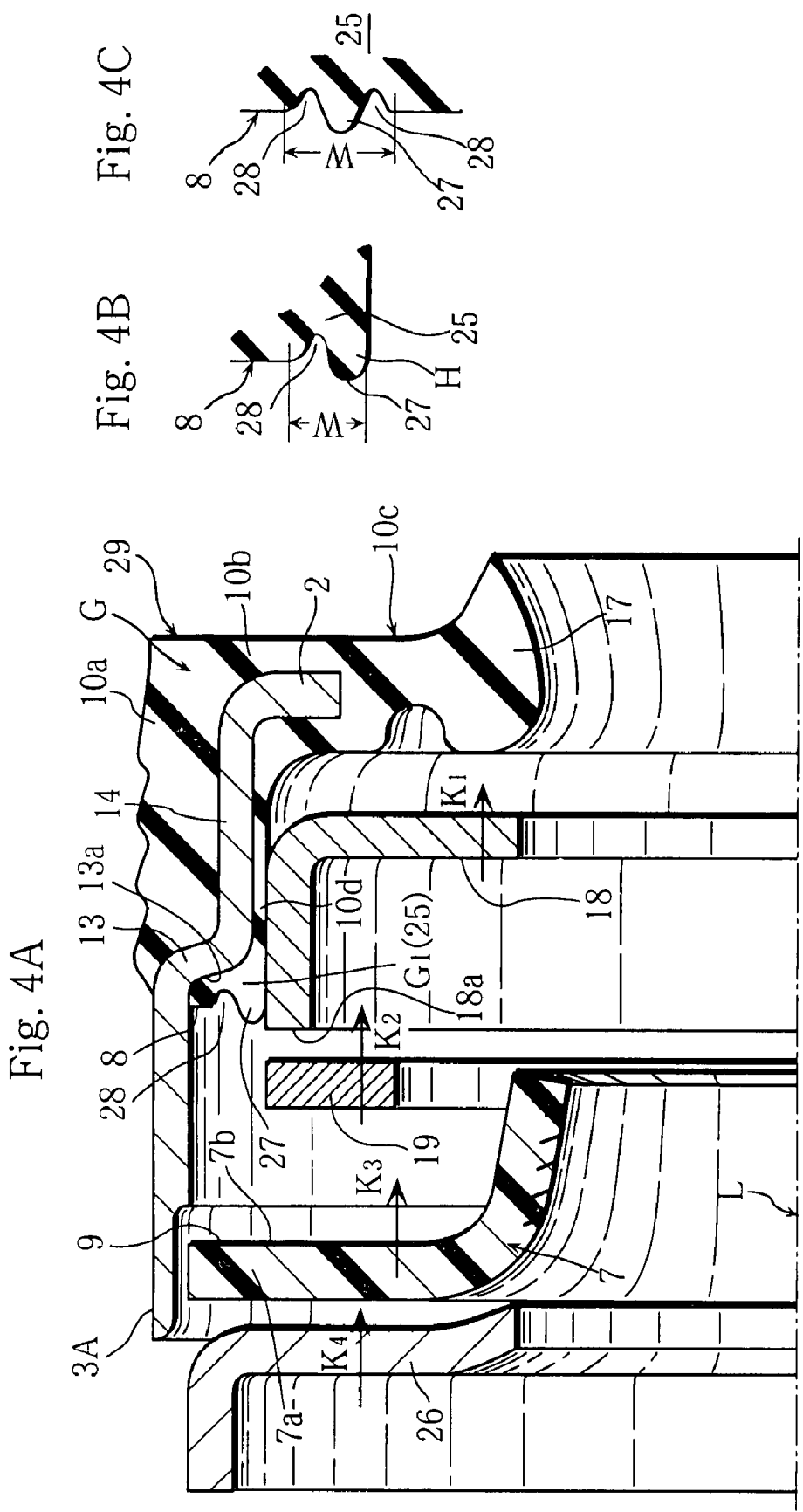
FIG. 4A is an explanatory view to show an assembly method.
FIG. 4B is an explanatory view to show a principal portion.
FIG. 4C is an explanatory view to show a principal portion.

In FIG. 1 and FIG. 2, a mark 1 represents an outer case of metal having inner brim portions 2 and 3, and rubber portion G, having a lip portion 17 touching the surface of the rotation shaft 20, is unitedly fixed to the outer case 1 of metal. The united fixation is conducted by adhesion, welding, or heat molding. The united fixation is shown in FIG. 3 showing pre-assembly state.

The outer case 1 has a cylindrical wall portion 12 corresponding to an inner peripheral face 22a of the housing 22, and a staged (stepped) portion 13 is formed on a middle position in an axis direction of the outer case 1 (the cylindrical wall portion 12) to divide a small cylinder portion 14 on the high-pressure side C and a large cylinder portion 15 on a low-pressure side E. As shown in FIG. 3, an inclination angle θ of the staged portion 13 to an axis L is 20°≦θ≦90°. Preferably the inclination angle θ is set to be 45°≦θ90°, and 60°≦θ≦90° is especially preferable.

In FIGS. 1, 2, and 3 through 6 serially showing assembly of the construction parts, the staged portion 13 and the small cylinder portion 14 of the outer case 1 and the inner brim portion 2 (on the high-pressure side C) are united with the rubber portion G (as to cover and surround) by adhesion, welding, or heat molding.

And, a seal element 7 with a spiral groove 6 is formed on the low-pressure side (opposite to the sealed fluid side or atmosphere side) E to the lip portion 17 of the rubber portion G. Material of the seal element 7 is preferably fluororesin such as PTFE. A flat plate of the material having a certain thickness is punched to be a ring flat plate and bent to be L-shaped in cross section as shown in FIGS. 1 and 2 as the seal element 7, the rotation shaft 20 is inserted, and the seal element 7 slides on the surface of the rotation shaft 20 in rotation and pushes fluid back to the high-pressure side C.

An end face 13a on the inner side of the staged portion 13 is unitedly covered by a part $G_1$ of the rubber portion G. That is to say, the part $G_1$ is unitedly covering the end face 13a by adhesion, welding, or heat molding. A rubber end face 8 in a direction at right angles with the axis L, namely, axis-orthogonal direction, is formed with the unitedly covering part $G_1$ and directed to the low-pressure side E. And, a face 9 of a peripheral edge 7a of the seal element 7 directed to the high-pressure side C is pressed to the rubber end face 8.

The rubber portion G, unitedly fixed to the outer case 1, has a cylinder-covering portion 10a of which peripheral face is formed into concavo-convex wave (in free state) to elastically contact the inner peripheral face of the housing 22 for sealing function. Concretely, the cylinder-covering portion 10a is covering and unitedly fixed to the small cylinder portion 14 of the outer case 1 and an outer face of the staged portion 13. And, the rubber portion G, having an inner brim covering portion 10b of which cross section is U-shaped to cover the both faces of the inner brim portion 2 of the outer case 1, is provided with an axis-orthogonal wall portion 10c which extends inward the lip portion 17 in radial direction. That is to say, the axis-orthogonal wall portion 10c is composed of the inner brim covering portion 10b and the lip portion 17.

Further, the rubber portion G has an inner face covering portion 10d of thin plate (film) covering the inner face of the small cylinder portion 14 of the outer case 1. That is to say, the inner brim covering portion 10b and the part $G_1$ forming the rubber end face 8 are connected by the inner face covering portion 10d of thin plate (film).

As described above, the rubber portion G is unitedly fixed to the outer case 1 as to cover the staged portion 13 and the small cylinder portion 14 of the outer case 1 and the inner brim portion 2 on both of peripheral and inner peripheral faces, and the lip portion 17 of the axis-orthogonal wall portion 10c at right angles with the axis L of the rotation shaft 20 forms a sliding portion 23 of which inner peripheral edge has a round portion (R-shaped portion).

A supporting metal 18, having a cross section of inverted L, is press-fit to the inner peripheral face of the inner face covering portion 10d and receiving (supporting) a back face of the axis-orthogonal wall portion 10c. A small concave groove portion 24 of a ring as a whole is formed on the back face of the axis-orthogonal wall portion 10c, and rubber material moves inward in radial direction to reduce contact pressure of the sliding portion 23 on the rotation shaft 20 when receiving pressure from the sealed fluid chamber 21.

A mark 19 represents an inner member of metal. The inner member 19 is a flat washer in Figures and disposed between an end face 18a of the supporting metal 18 on the low-pressure side E and a high-pressure side 7b of the seal element 7 as to be press-fit (caulked). To explain further in detail, when the part $G_1$ of the rubber portion G covering the end face 13a of the staged portion 13 of the outer case 1 is called an end face-covering ring rubber portion 25, a peripheral face 19a of the inner member 19 of metal receives (supports) an inner peripheral face of the end face-covering ring rubber portion 25. In other words, the inner member 19 of metal is simultaneously receiving the high-pressure side 7b of the seal element 7 and the inner peripheral face of the end face-covering ring rubber portion 25.

A mark 26 represents an inner case of metal of which cross section is approximately inverted L-shaped, is press-fit to and receiving (supporting) a low-pressure side 7c of the seal element 7. And, an inner brim portion 3 on the low-pressure side E, bent to an arrow M direction in FIG. 6 by plastic working (press working), is in cooperation with the inner brim portion 2 on the high-pressure side C to press (hold) and fix the constructional parts.

As described above, the staged portion 13 is formed on the middle position in the axis L direction of the outer case 1, the large cylinder portion 15 is formed on the low-pressure side E, and the end face 13a on inner side of the staged portion 13 is formed as to be directed to the low-pressure side E and at right angles with the axis. Then, the end face 13a is unitedly covered with the part $G_1$ of the rubber portion G to form the rubber end face 8 in axis-orthogonal direction (as axis-orthogonal face), the peripheral edge 7a of the seal element 7 is pressed through the inner case 26 by the plastic deformation shown with the arrow M in FIG. 6 to firmly press-fit the face 9, facing the high-pressure side C of the peripheral edge 7a of the seal element 7, to the rubber end face 8 as shown with arrows f in FIG. 6.

Figure 5:
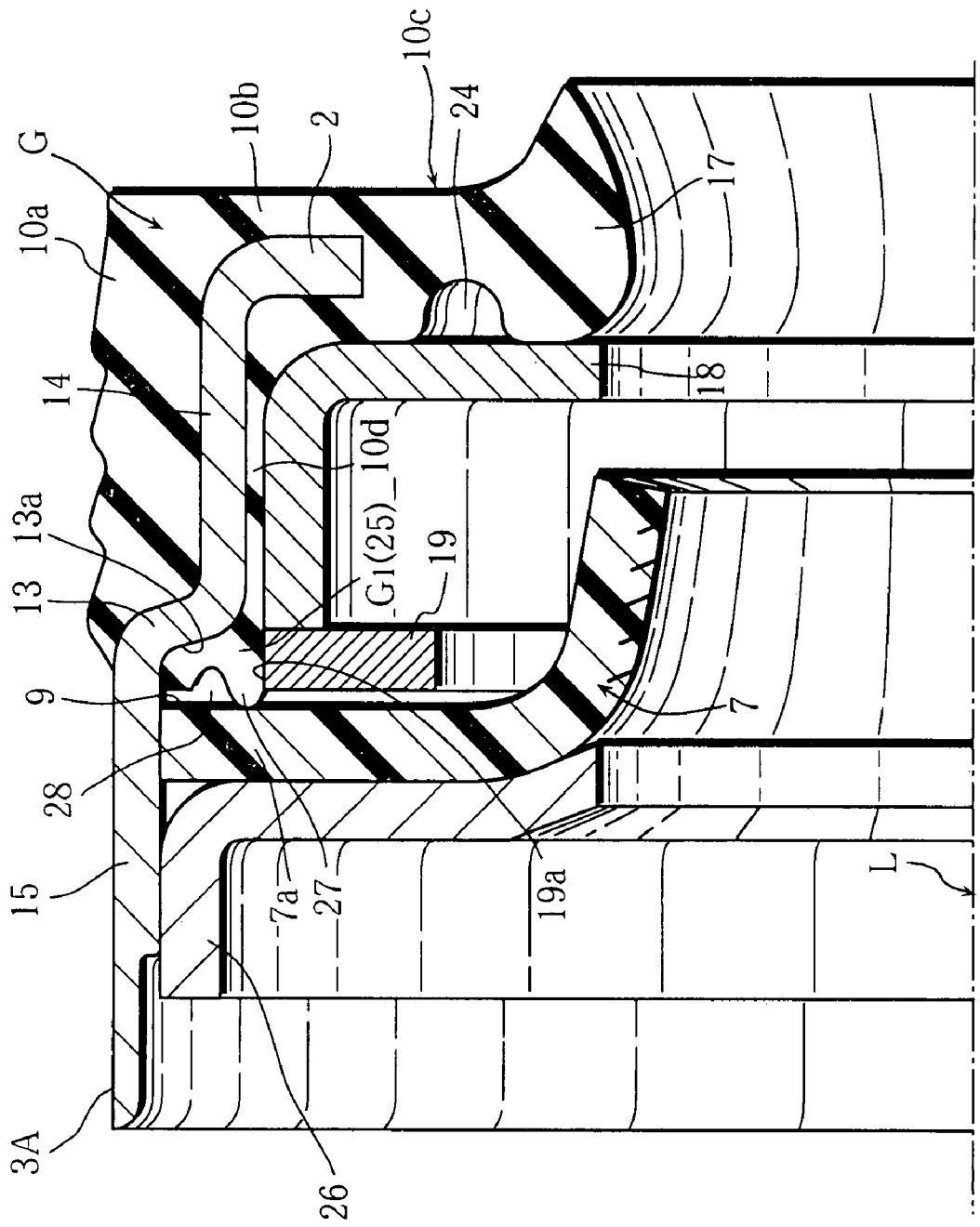
FIG. 5 is an explanatory cross-sectional view of a principal portion to explain the assembly method.
Figure 6:
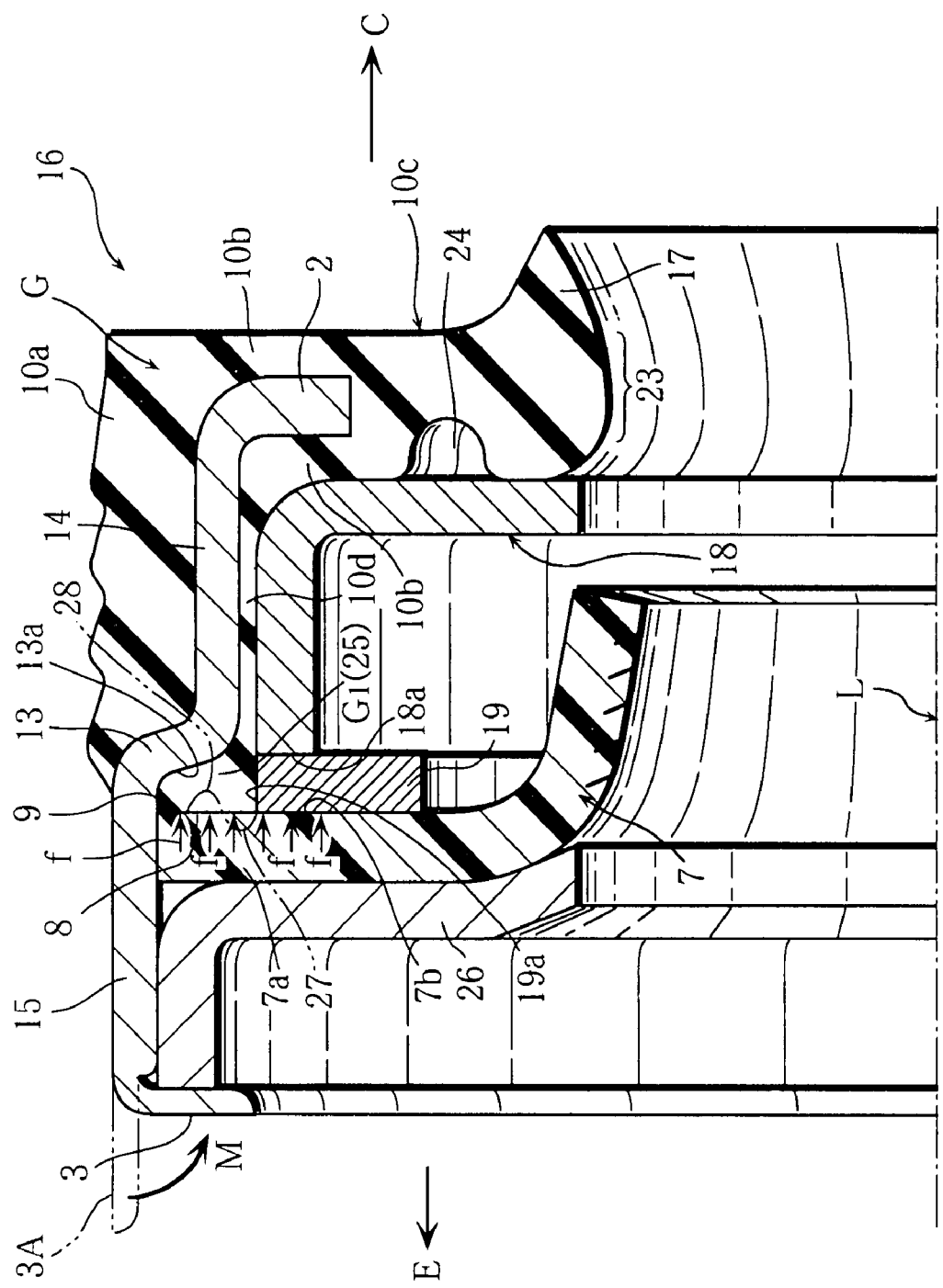
FIG. 6 is an explanatory cross-sectional view of the principal portion to explain the assembly method.

As shown in FIG. 3, FIG. 4A, and FIG. 5, a small ridge 27 and a small concave groove 28 of ring are concentrically formed on the rubber end face 8 in unpress-fit state of the seal element 7. And, as shown in FIG. 6, the small ridge 27 elastically deforms as the rubber material flows into the small concave groove 28 by the press fitting of the face 9 (shown with the arrows f) of the peripheral edge 7a in press-fit assembly state of the seal element 7 to keep the sealed state. The small ridge 27 and the small concave groove 28 are shown with two-dot broken lines in FIGS. 2 and 6. The rubber end face 8 elastically deforms along the axis-orthogonal face and the portion where the small ridge 27 was formerly formed is press-fit to the face 9 of the seal element 7 with high contact pressure in the press-fit assembly state to secure the sealability.

To describe further, the end face 13a on inner side of the staged portion 13 of the outer case 1 stops (receives) the flow of the rubber material of the ring rubber portion 25 toward the high-pressure side C, the ring rubber portion 25 is certainly compressed elastically, and the portion where the small ridge 27 was formerly formed is press-fit to the face 9 of the seal element 7 with high contact pressure to demonstrate the sealability.

In FIG. 3, FIG. 4A, and FIG. 4B, number of the small ridge 27 and the concave groove 28 is respectively one. Concretely, one small ridge 27 is disposed on an inner peripheral corner portion H of the end face-covering ring rubber portion 25, and one concave groove 28 having larger radius than that of the small ridge 27 is disposed near the small ridge 27. And, as the face 9 of the seal element 7 presses the small ridge 27 as serially shown in FIG. 5 and FIG. 6, the rubber material of the small ridge 27 protruding from the corner portion H flows inward in radius direction to the small concave groove 28. However, the inner member 19 of ring flat washer can stop the flow of the rubber material in radius direction.

In other words, the peripheral face 19a of the inner member 19 stops the inward flow of the rubber material of the small ridge 27 in radius direction.

In FIG. 3, a main unit 29 in which the rubber portion G having the lip portion 17 is unitedly fixed to the outer case 1 of metal. The outer case 1 has a thin extended portion 3A which is the large cylinder portion 15 extended before the bent plastic work in the arrow M direction in FIG. 6. Next, the supporting metal 18, the inner member 19, the seal element T, and the inner case 26 are fit into the main unit 29 as shown with arrows $K_1$, $K_2$, $K_3$, and $K_4$, to make the state just before the completion of assembly shown in FIG. 5. Then, when the thin extended portion 3A is plastically deformed as to be bent into the arrow M direction as shown in FIG. 6, the inner brim portion 2 (the axis-orthogonal wall portion 10c) and the newly-formed inner brim portion 3 firmly hold the parts, and the small ridge 27 shown with a two-dot broken line is turned into the rubber end face 8 along the axis-orthogonal face (as shown with a solid line) by face pressure shown with the arrows f. In this process, the peripheral face 19a of the inner member 19 prevents the small ridge 27 shown with the two-dot broken line from falling down (escape of the rubber material) into the radius direction.

When a rubber deformation portion for stopping inner leak is composed of one small ridge 27 protruding from the corner portion H and one neighboring small concave groove 28 on outer side, a width dimension W in radius direction can be small, and the rubber deformation portion for stopping inner leak can be easily formed even in case that staged dimension of the staged portion 13 of the outer case 1, namely, the width dimension of the rubber end face 8 in radius direction, is small. When the staged dimension of the staged portion 13, namely, the dimension of the rubber end face 8 in radius direction, is ample, it is also preferable to compose the rubber deformation portion for stopping inner leak of one small ridge 27 and two small concave grooves 28 each of which is on inner and outer sides of the small ridge 27 as shown in FIG. 4C. In this case, the width dimension W in radius direction becomes larger.

And, in FIGS. 1 through 6, the high-pressure side 7b on the middle portion of the seal element 7 is received (supported) by the inner member 19 and kept into normal posture without deformation falling into the high-pressure side C.

In the present invention, the part $G_1$ (of the rubber portion G) covering the end face 13a on inner side of the staged portion 13, namely, the end face-covering ring rubber portion 25 and the axis-orthogonal wall portion 10c may be not unitedly connected but separately disposed (not shown in Figures). That is to say, the inner face covering portion 10d may be omitted, the rubber portion G may be divided into two (or more) pieces and united with the outer case 1 by heat molding, adhesion, or welding (not shown in Figures).

And, it is not preferable that the inclination angle θ of the staged portion 13 (the end face 13a) to the axis L (refer to FIG. 3) is less than 20° because the ring rubber portion 25 becomes excessively long in the axis direction and reactional force of elastic compression becomes excessively weak. It is preferable to make the reactional force of elastic compression high by setting the inclination angle θ of the to be 45°≦θ to keep enough contact pressure of the small ridge 27 to the peripheral edge 7a. Especially, 60°≦θ is preferable because high contact pressure can be obtained. And, when 90°≦θ, it is difficult to form the staged portion 13 on the outer case 1 by plastic work.

In the present invention, not restricted to the embodiments shown in Figures, the configuration of the lip portion 17, not restricted to the configuration in which the sliding portion 23 is on the axis-orthogonal face $P_0$ including the inner brim portion 2 (as shown in FIG. 2), may be altered to various configurations (not shown in Figures). And, the inner member 19 may be united with the supporting metal 18 in Figures, and it may be preferable to form a corner portion, receiving the end face-covering ring rubber portion 25 (the corner portion H), into right angle by machine work (cutting, etc.). Further, the inner member 19 may be composed of a block made by machine work. In this case, it is preferable to form a corner portion, receiving the end face-covering ring rubber portion 25 (the corner portion H), into right angle.

Figure 7:
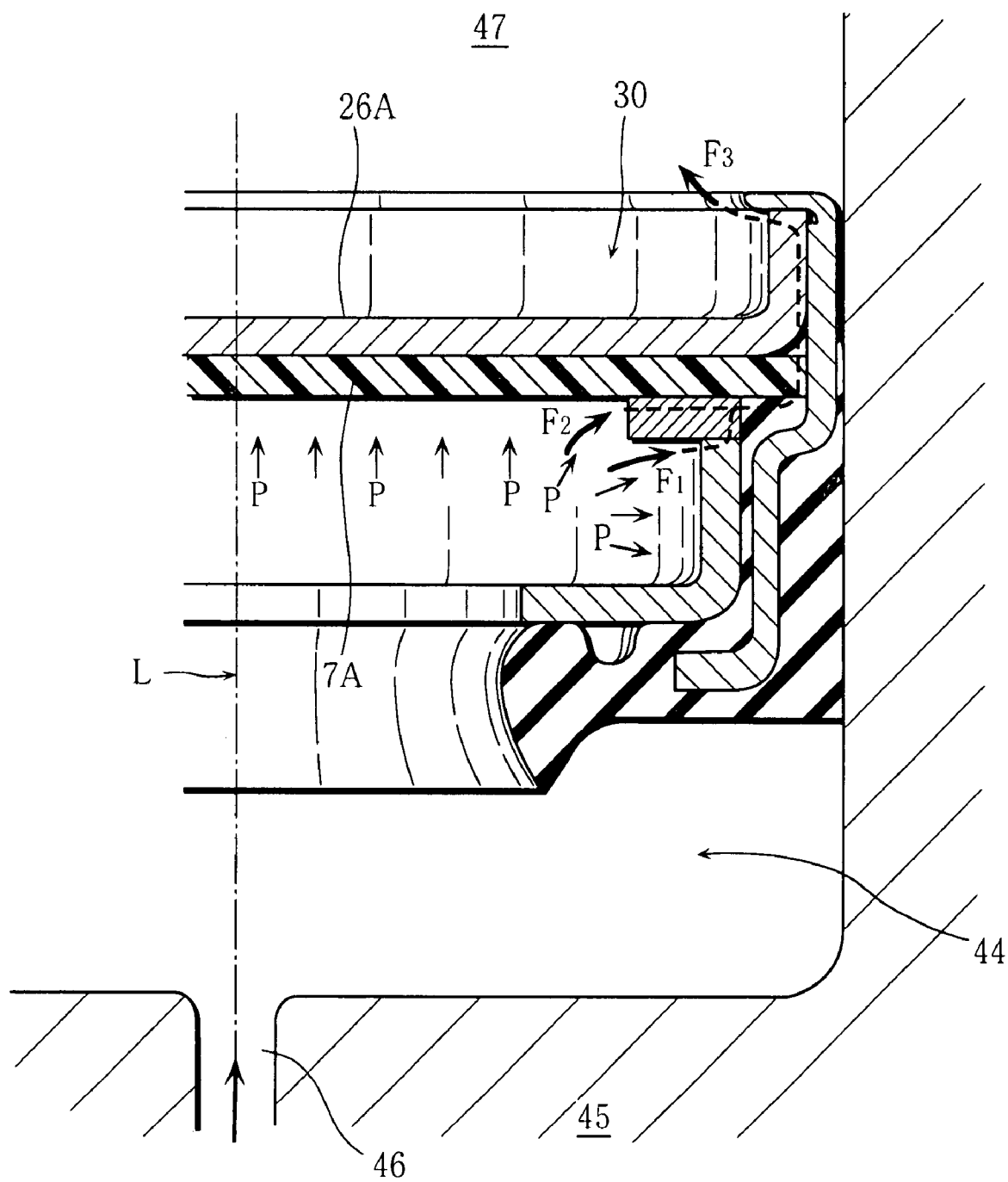
FIG. 7 is an explanatory view of a test apparatus as a sample of the present invention and testing method of the same.
Figure 8:
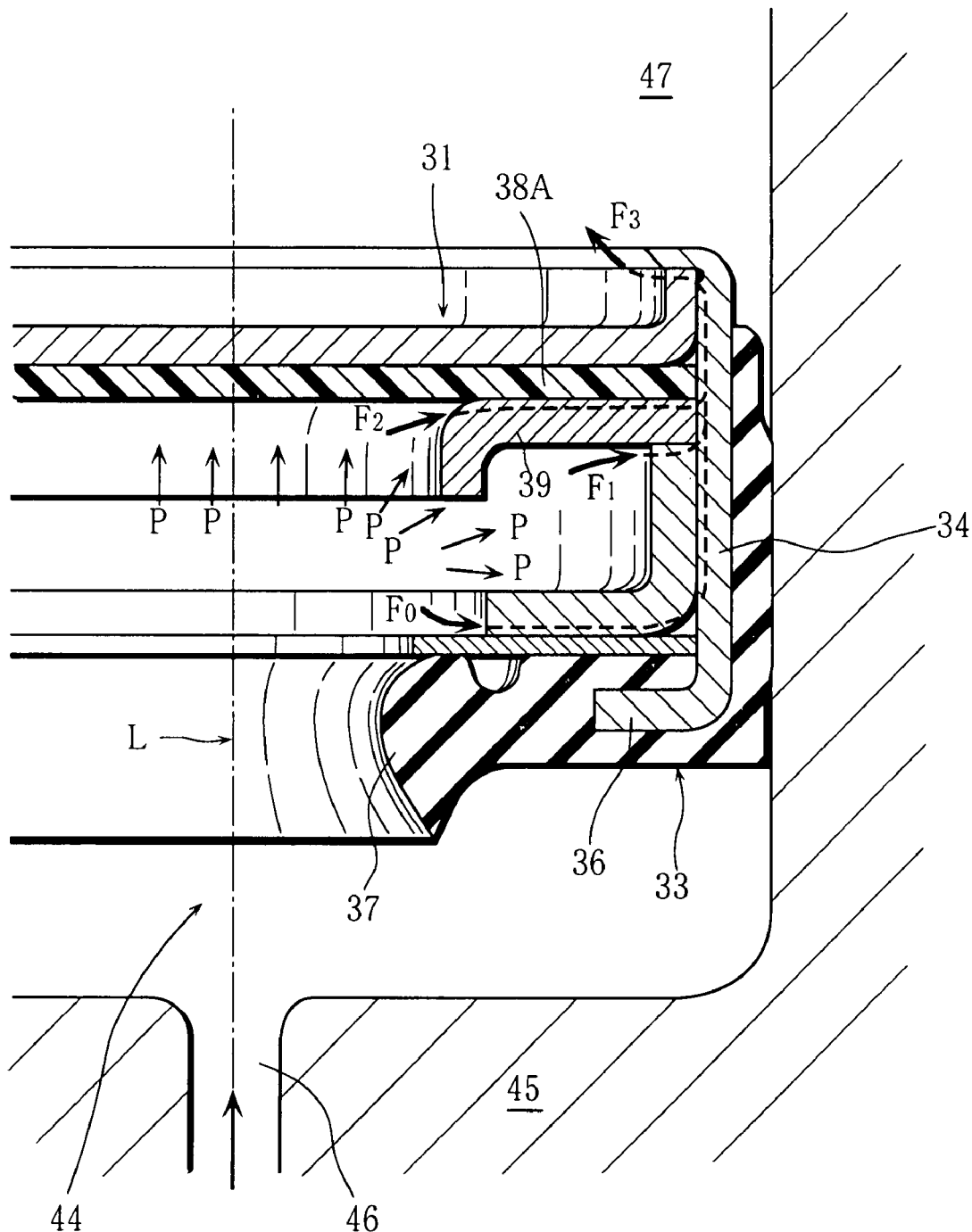
FIG. 8 is an explanatory view of a test apparatus as a conventional sample and testing method of the same.

Next, a sample 30 of the present invention is shown in FIG. 7 and a conventional sample 31 (of the conventional example in FIG. 9) is shown in FIG. 8. In FIG. 7, as clearly shown in comparison with FIGS. 1 and 2, the seal element 7 is replaced with a seal element corresponding part 7A of circular plate, the inner case 26 is replaced with an inner case corresponding part 26A of shallow dish (without a hole), and other parts are same as the embodiment shown in FIGS. 1 and 2.

On the other hand, in FIG. 8, as clearly shown in comparison with FIG. 9, the seal element 38 is replaced with a seal element corresponding part 38A of circular plate, the inner case 40 is replaced with an inner case corresponding part 40A of shallow dish (without a hole), and other parts are same as the embodiment shown in FIG. 9.

As shown in FIG. 7 and FIG. 8, the samples 30 and 31 are respectively set into a cylindrical jig main body 45 having a cylindrical space 44 making an axis L vertical. Then, $CO_2$ gas is sent through a pressure-adding duct 46 to give predetermined pressure P.

Regarding fluid leakage from the contact portions of the lip portions 17 and 3T and the seal elements 7 and 38 on the rotation shafts 20 and 32 as 0, 10 units of the present invention and the conventional sample were respectively tested whether inner leak, shown with arrows $F_1$, $F_2$, $F_3$, and $F_0$ and broken lines through the inner peripheral face of the outer cases 1 and 34, is generated or not. An upper space 47 corresponding to the low-pressure side is filled with water.

Increasing pressure P serially from 1 MPa to 5 MPa through 2, 3, and 4 MPa, and bubble generation and state of bubble were observed. Temperature is room temperature.

Result of the inner leak test is shown in the following table 1.

TABLE 1

| Pressure P (MPa) | SAMPLE 30 OF THE PRESENT INVENTION SHOWN IN FIG. 7 | CONVENTIONAL SAMPLE 31 SHOWN IN FIG. 8 |
| --- | --- | --- |
| 1 | NO BUBBLE GENERATED | SLIGHT AMOUNT OF BUBBLE GENERATION |
| 2 | NO BUBBLE GENERATED | SLIGHT AMOUNT OF BUBBLE GENERATION |
| 3 | NO BUBBLE GENERATED | SLIGHT AMOUNT OF BUBBLE GENERATION |
| 4 | NO BUBBLE GENERATED | LARGE AMOUNT OF BUBBLE GENERATION |
| 5 | NO BUBBLE GENERATED | LARGE AMOUNT OF BUBBLE GENERATION |

By the test result shown in the above table 1, the following points are shown.

(1) In the conventional sample 31 in FIG. 8 (the conventional embodiment in FIG. 9), the seal element 38 (38A) is press-fit by the inner case 39 and the inner case 40 (40A) to deform the seal element 38 (38A) outward in radius direction and press-fit to the inner peripheral face of the outer case 34. However, bubble amount tends to increase as the pressure P goes up. And, irregularity in leakage amount is also revealed.

(2) On the contrary, in the sample 30 (the embodiment in FIG. 1) of the present invention in FIG. 7, it is confirmed that inner leak is not generated at all stages of the pressure P. That is to say, the press-fitting of the small ridge 27 to the high-pressure side 7b of the seal element 7 effectively prevents the leak through the passage (route) shown with broken lines in FIG. 7, namely, inner leak.

As described above, in the rotation shaft seal of the present invention having a construction that the rubber portion G having the lip portion 17 to contact the surface of the rotation shaft 20 and the outer case 1 of metal to which the rubber portion G is unitedly fixed are provided, the rubber end face 8 in the axis-orthogonal direction is composed of the part $G_1$ of the rubber portion G and formed on the middle position in the axis direction on the inner face of the outer case 1, and the face of the peripheral edge 7a of the seal element 7 facing the high-pressure side C is press-fit to the rubber end face 8, inner leak is certainly stopped, high-pressurization of the gas (fluid) such as $CO_2$ can be handled, and the seal is easily made with small number of parts and simple construction.

And, in the rotation shaft seal of the present invention having a construction that the rubber portion G having the lip portion 17 to contact the surface of the rotation shaft 20 and the outer case 1 of metal to which the rubber portion G is unitedly fixed are provided, the staged portion 13 is formed on the middle position in the axis direction on the outer case 1, the end face 13a on inner side of the staged portion 13 is unitedly covered by the part $G_1$ of the rubber portion G to form the rubber end face 8 in the axis-orthogonal direction, and the face 9 of the peripheral edge Ta of the seal element 7 facing the high-pressure side C is press-fit to the rubber end face 8, inner leak is certainly stopped, high-pressurization of the gas (fluid) such as $CO_2$ can be handled, and the assembly and production of the seal is not difficult because number of parts does not increase.

And, in the rotation shaft seal provided with a construction that the rubber portion G having the lip portion 17 to contact the surface of the rotation shaft 20 and the outer case 1 of metal to which the rubber portion G is unitedly fixed, the outer case 1 has the cylindrical wall portion 12 corresponding to the inner peripheral face 22a of the housing 22, the staged portion 13 is formed on the middle position in the axis direction of the outer case 1 and on the cylindrical wall portion 12 to divide the small cylinder portion 14 on the high-pressure side C and the large cylinder portion 15 on the low-pressure side E, the end face 13a on inner side of the staged portion 13 is unitedly covered by the part $G_1$ of the rubber portion G to dispose the rubber end face 8 in the axis-orthogonal direction as to be directed to the low-pressure side E, and the face 9 of the peripheral edge Ta of the seal element 7 facing the high-pressure side C is press-fit to the rubber end face 8, the construction is simple, number of parts does not increase, assembly and production of the seal is easy, inner leak through a passage near the peripheral edge 7a of the seal element 7 is certainly prevented, and the seal is proper for sealing gas such as $CO_2$ which has been recently high-pressurized.

And, fluid leakage (inner leak) going through a passage near the peripheral edge 7a of the seal element 7 is artfully prevented and the construction is simple effectively utilizing elastic compression force of rubber material because the small ridge 27 and the small concave groove 28 are concentrically formed on the rubber end face 8 in unpress-fit state of the seal element 7, and rubber material of the small ridge 27 is elastically deformed as to flow into the small concave groove 28 by press-fitting of the face 9 of the peripheral edge 7a of the seal element 7 as to keep sealing in press-fit assembly state of the seal element 7.

And, the seal element 7 keeps normal posture (without falling down), pumping function of the seal element 7 is certainly conducted, further, the ring rubber portion 25 is prevented from being abnormally deformed, and inner leak is prevented effectively further by keeping high contact pressure of the small ridge 27 to the high-pressure side 7b of the seal element 7 because the end face-covering ring rubber portion 25, composed of the part $G_1$ of the rubber portion G and covering the end face 13a on inner side of the staged portion 13, is provided, and the inner member 19 of metal, receiving the high-pressure side 7b of the seal element 7 and the inner peripheral face of the end face-covering ring rubber portion 25, is attached.

And, even if the width dimension of the staged portion 13 is small, namely, when the width dimension in radius direction of the rubber end face 8 is small, inner leak can be prevented by sufficient sealing because the small ridge 27 is disposed on the inner-peripheral corner portion H on the high-pressure side of the end face-covering ring rubber portion 25, the small concave groove 28, having a radius dimension larger than that of the small ridge 27, is disposed near the small ridge 27, and the peripheral face 19a of the inner member 19 stops inward flowing of the rubber material of the small ridge 27 in radius direction in the press-fit assembly state of the seal element 7.

While preferred embodiments of the present invention have been described in this specification, it is to be understood that the invention is illustrative and not restrictive, because various changes are possible within the spirit and indispensable features.

What is claimed is:

1. A rotation shaft seal provided with a rubber portion having a lip portion to contact a surface of a rotation shaft and an outer case of metal to which the rubber portion is unitedly fixed, comprising a construction in which the outer case has a cylindrical wall portion corresponding to an inner peripheral face of a housing, a staged portion is formed on a middle position in an axis direction of the outer case and on the cylindrical wall portion to divide a small cylinder portion on a high-pressure side and a large cylinder portion on a low-pressure side, an end face on an inner side of the staged portion is unitedly covered by a part of the rubber portion to dispose a rubber end face in an axis-orthogonal direction as to be directed to the low-pressure side, and a face of a peripheral edge of a seal element facing the high-pressure side is press-fit to the rubber end face; wherein a small ridge and a small concave groove are concentrically formed on the rubber end face in unpress-fit state of the seal element, and rubber material of the small ridge is elastically deformed as to flow into the small concave groove by press-fitting of the face of the peripheral edge of the seal element as to keep sealing in press-fit assembly state of the seal element;

an end face-covering ring rubber portion, composed of the part of the rubber portion and covering the end face on the inner side of the staged portion is provided, and an inner member of metal, receiving a high-pressure side of the seal element and an inner peripheral face of the end face-covering ring rubber portion, is attached;

the small ridge is disposed on an inner-peripheral corner portion on the low-pressure side of the end face-covering ring rubber portion, the small concave groove, having a radius dimension larger than that of the small ridge, is disposed near the small ridge, and a peripheral face of the inner member stops inward flowing of the rubber material of the small ridge in a radius direction in the press-fit assembly state of the seal element; and wherein a supporting metal is provided, a peripheral face of the supporting metal is elastically pressed to an inner peripheral face of a thin inner face covering portion of the rubber portion, and an end face of the supporting metal contacts the inner member.

* * * * *